United States Patent
Feehrer et al.

(10) Patent No.: US 10,853,303 B2
(45) Date of Patent: *Dec. 1, 2020

(54) SEPARATION OF CONTROL AND DATA PLANE FUNCTIONS IN SOC VIRTUALIZED I/O DEVICE

(71) Applicant: Oracle International Corporation, Redwood City, CA (US)

(72) Inventors: John R. Feehrer, Westford, MA (US); Matthew Cohen, Cambridge, MA (US); Rahoul Puri, Los Altos, CA (US); John Johnson, San Jose, CA (US); Alan Adamson, San Diego, CA (US); Julia Harper, Arlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 14/944,835

(22) Filed: Nov. 18, 2015

(65) Prior Publication Data

US 2017/0139873 A1 May 18, 2017

(51) Int. Cl.
*G06F 9/455* (2018.01)
*G06F 13/42* (2006.01)
*G06F 13/40* (2006.01)
*G06F 13/10* (2006.01)

(52) U.S. Cl.
CPC .......... *G06F 13/4286* (2013.01); *G06F 9/455* (2013.01); *G06F 13/102* (2013.01); *G06F 13/4022* (2013.01)

(58) Field of Classification Search
CPC ............. G06F 13/4027; G06F 13/4221; G06F 13/4282
See application file for complete search history.

(56) References Cited

U.S. PATENT DOCUMENTS

| | | | |
|---|---|---|---|
| 8,464,260 B2* | 6/2013 | Riley | G06F 9/468 710/313 |
| 8,601,170 B1* | 12/2013 | Marr | G06F 8/65 710/8 |
| 8,964,601 B2 | 2/2015 | Kamath | |

(Continued)

OTHER PUBLICATIONS

Abraham Silberschatz, et al, Operating System Concepts, Third Edition, book, Reprinted Sep. 1991, pp. 96-97, 601-602, Addison-Wesley Publishing Company, published U.S.

*Primary Examiner* — Tim T Vo
*Assistant Examiner* — Harry Z Wang

(57) ABSTRACT

An apparatus and method for controlling a virtualized endpoint device are disclosed. A processor may be configured to execute instructions included in multiple execution threads. A first device may be configured to perform multiple command and data functions, and a communication unit may include a first port coupled to the first device via a first link and be configured to send instructions from the processor to the first device via the first link using a first communication protocol. The processor may be further configured to execute first and second sets of commands included in respective execution threads. The first set of commands may be associated with the plurality of command functions and the second set of commands may be associated with the plurality of data functions.

19 Claims, 5 Drawing Sheets

(56) References Cited

U.S. PATENT DOCUMENTS

| | | | |
|---|---|---|---|
| 9,928,207 B1* | 3/2018 | Habusha | G06F 13/4282 |
| 10,521,365 B2* | 12/2019 | Bshara | G06F 13/24 |
| 2005/0198601 A1* | 9/2005 | Kuang | G06F 17/5022 |
| | | | 716/108 |
| 2008/0148032 A1* | 6/2008 | Freimuth | G06F 13/42 |
| | | | 713/1 |
| 2011/0107406 A1* | 5/2011 | Frost | G06F 9/45558 |
| | | | 726/6 |
| 2011/0219164 A1* | 9/2011 | Suzuki | G06F 13/12 |
| | | | 710/316 |
| 2013/0151750 A1* | 6/2013 | Kanigicherla | G06F 13/4022 |
| | | | 710/313 |
| 2013/0195113 A1 | 8/2013 | Kotha | |
| 2013/0283264 A1* | 10/2013 | Bhattacharya | G06F 9/45558 |
| | | | 718/1 |
| 2014/0201303 A1 | 7/2014 | Dalal | |
| 2016/0147551 A1* | 5/2016 | Tsirkin | G06F 9/45558 |
| | | | 718/1 |

\* cited by examiner

SEPARATION OF CONTROL AND DATA PLANE FUNCTIONS IN SOC VIRTUALIZED I/O DEVICE

BACKGROUND

Technical Field

This invention relates to computing systems, and more particularly, to techniques for managing control and data functions in a device.

Description of the Related Art

Computing systems include multiple multi-threaded processors and devices, where each each processor may send data to or receive data from a particular device. For example, the devices may include ethernet network interface cards (NICs) that allow the processors to communicate with other computing systems, and other devices either internal or external to the computing system such as printers or storage devices, for example.

Hardware resources associated with a particular device may be shared between various threads being executed by one or more of the multi-threaded processors. During operation, a given thread may execute one or more software instructions that request access, either a read or write, to a particular hardware resource of a given device. The computing system may format and transmit the access request to the particular hardware resource via a packetized serial communication link.

To manage access requests from the various threads, a device may include dedicated hardware to perform control and data functions within the device. In some cases, the dedicated hardware may include an embedded processor, or other suitable general-purpose processor, configured to execute multiple software instructions. In some computing systems, a device with shared hardware resources may be integrated into a System-on-a-Chip (SoC) along with one or more multi-threaded processors, for improved performance.

SUMMARY OF THE EMBODIMENTS

Various embodiments of an apparatus and method for handling interrupts in a computing system are disclosed. Broadly speaking, a method and apparatus are contemplated in which a processor is configured to execute instructions included in one or more execution threads. A first device is configured to perform a first plurality of functions and a second plurality of functions, and a communication unit includes a first port coupled to the first device via a first link. The first plurality of functions may include at least a first function to manage communication to the first device, and the second plurality of functions may include at least a second function to modify data received by the first device. The first port is configured to send one or more first instructions from the processor to the first device via the first link using a first communication protocol. The processor may be further configured to execute a first set of commands included in a first execution thread of the one or more execution threads and a second set of commands included in a second execution thread of the one or more execution threads. The first set of commands may be associated with the first plurality of functions and the second set of commands may be associated with the second plurality of functions.

In a non-limiting embodiment, the communication unit may be coupled to a second device via a second link. A second port of the communication unit may be configured to send one or more second instructions to the second device via the second link using a second communication protocol different from the first communication protocol.

In one implementation, the processor, the first device and the communication unit may be included in a common integrated circuit chip. In another non-limiting embodiment, the second set of commands may be included in device driver software for the first device.

Figure 1:
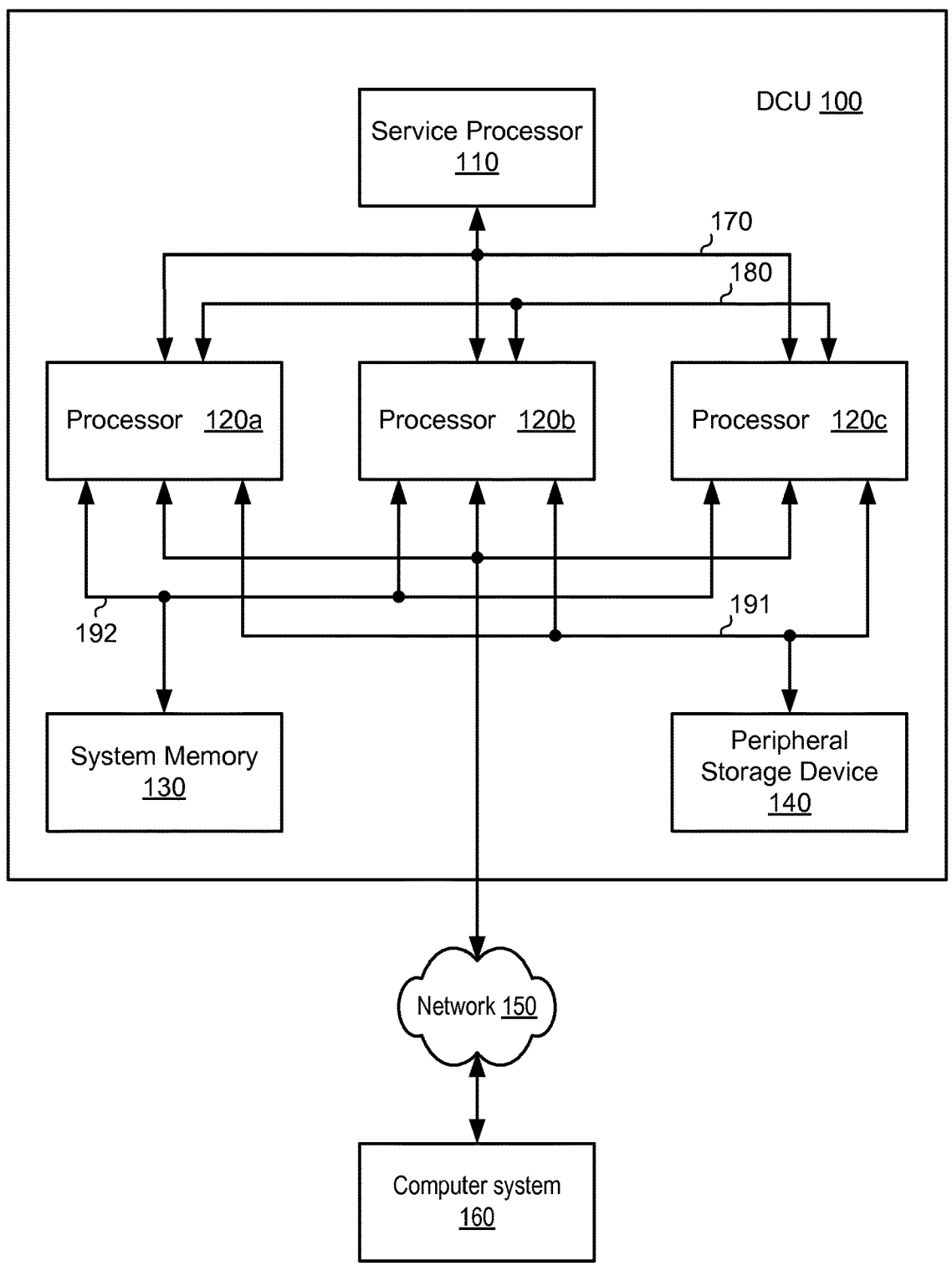
FIG. 1 is a block diagram of an embodiment of a distributed computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Multi-processor computing systems may support the use of one or more virtual machines, each running a respective Guest Operating System (GOS). Hardware resources, such as, e.g., an Input/Output (I/O) subsystem, may be shared between the various GOSs. During operation of such multi-processor computing systems, there may be many requests generated by software programs executing within the GOSs to transfer data to, or retrieve data from peripheral storage devices or other computing systems.

I/O subsystems may include multiple ports coupled to a common communication hub. For example, some systems may employ multiple PCI-Express Root Ports coupled to a common Root Complex. Each Root Port may handle data transfers with a device. In some cases, the hardware resources of the device may be shared among different threads being executed by a processor or among multiple GOSs. Each of the shared hardware resources appear as a dedicated resource to the different GOSs and threads sharing the hardware resources. A device whose hardware resources are shared in this manner is commonly referred to as a "virtualized device."

Access to the hardware resources of a device between the various GOSs and threads are managed by control plane functions associated with the device. To implement such control functions, an embedded processor included in the device may execute firmware loaded into the device during initialization of the computing system. When a virtualized device is integrated into a System-on-a-chip (SoC), the embedded processor adds extra area, power consumption, and increases test complexity for the SoC. The embodiments illustrated in the drawings and described below may provide techniques for separating control and data functions in a virtualized device integrated into a SoC to reduce complexity of the virtualized device by simplifying circuitry dedicated to the control plane functions.

A block diagram illustrating one embodiment of a distributed computing unit (DCU) 100 is shown in FIG. 1. In the illustrated embodiment, DCU 100 includes a service processor 110, coupled to a plurality of processors 120a-c through bus 170. It is noted that in some embodiments, service processor 110 may additionally be coupled to system memory 130 through bus 170, and may coordinate initialization and boot of processors 120a-c, such as from a power-on reset. Processors 120a-c are, in turn, coupled to system memory 130, and peripheral storage device 140. Processors 120a-c are further coupled to each other through bus 180 (also referred to herein as "coherent interconnect 180"). DCU 100 is coupled to a network 150, which is, in turn coupled to a computer system 160. In various embodiments, DCU 100 may be configured as a rack-mountable server system, a standalone system, or in any suitable form factor. In some embodiments, DCU 100 may be configured as a client system rather than a server system.

System memory 130 may include any suitable type of memory, such as Fully Buffered Dual Inline Memory Module (FB-DIMM), Double Data Rate, Double Data Rate 2, Double Data Rate 3, or Double Data Rate 4 Synchronous Dynamic Random Access Memory (DDR/DDR2/DDR3/DDR4 SDRAM), or Rambus® DRAM (RDRAM®), for example. It is noted that although one system memory is shown, in various embodiments, any suitable number of system memories may be employed. Each of processors 120a-c is coupled to system memory 130 via bus 192.

Storage device 140 may, in some embodiments, include magnetic, optical, or solid-state storage media such as hard drives, optical disks, non-volatile random-access memory devices, etc. In other embodiments, storage device 140 may include more complex storage devices such as disk arrays or storage area networks (SANs), which may be coupled to processors 120a-c via bus 191, which may implement a particular communication protocol, such as, a standard Small Computer System Interface (SCSI), a Fiber Channel interface, a Firewire® (IEEE 1394) interface, Peripheral Component Interface Express (PCIe), or another suitable interface. Additionally, it is contemplated that in other embodiments, any other suitable peripheral devices may be coupled to processors 120a-c, such as multi-media devices, graphics/display devices, standard input/output devices, etc.

As described in greater detail below, each of processors 120a-c may include one or more processor cores and cache memories. In some embodiments, each of processors 120a-c may be coupled to a corresponding system memory, while in other embodiments, processors 120a-c may share a common system memory. Processors 120a-c may be configured to work concurrently on a single computing task and may communicate with each other through coherent interconnect 180 to coordinate processing on that task. For example, a computing task may be divided into three parts and each part may be assigned to one of processors 120a-c. Alternatively, processors 120a-c may be configured to concurrently perform independent tasks that require little or no coordination among processors 120a-c.

The embodiment of the distributed computing system illustrated in FIG. 1 is one of several examples. In other embodiments, different numbers and configurations of components are possible and contemplated. It is noted that although FIG. 1 depicts a multi-processor system, the embodiments described herein may be employed with any number of processors, including a single processor.

The use of virtualized devices in a computing system, such as, e.g., DCU 100, may allow multiple guest operating system (GOS) instances to share hardware such that individual GOS instances are protected and isolated from each other. Through isolation of individual GOS instances, efficient use of a computing system's virtualized resources may be realized, while keeping the GOS instances from interfering with each other. For example, a fatal error or performance bottleneck in one GOS instance should not disrupt the operation of other GOS instances. The use of virtualization may, in various embodiments, allow for a lower cost of a computing system. For example, a datacenter may employ a single virtualized system as opposed to purchasing multiple servers, thereby lowering the overall cost of the computing system.

In particular, I/O subsystems, i.e., collections of circuit blocks configured to perform communication tasks with devices may also be virtualized, thereby allowing I/O devices such as a NIC or disk controller to be shared by multiple GOS instances. In order to virtualize I/O device, an I/O device interrupt must be able to communicate with each GOS sharing the resources of the particular I/O device. As will be described below in more detail, certain protocols may be employed to allow inband access to both control and data plane functions of a virtualized I/O device.

The embodiment of the computing system illustrated in FIG. 1 is one of several examples. In other embodiments, different numbers and configurations of components are possible and contemplated. It is noted that although FIG. 1 depicts a multi-processor system, the embodiments described herein may be employed with any number of processors, including a single processor.

Figure 2:
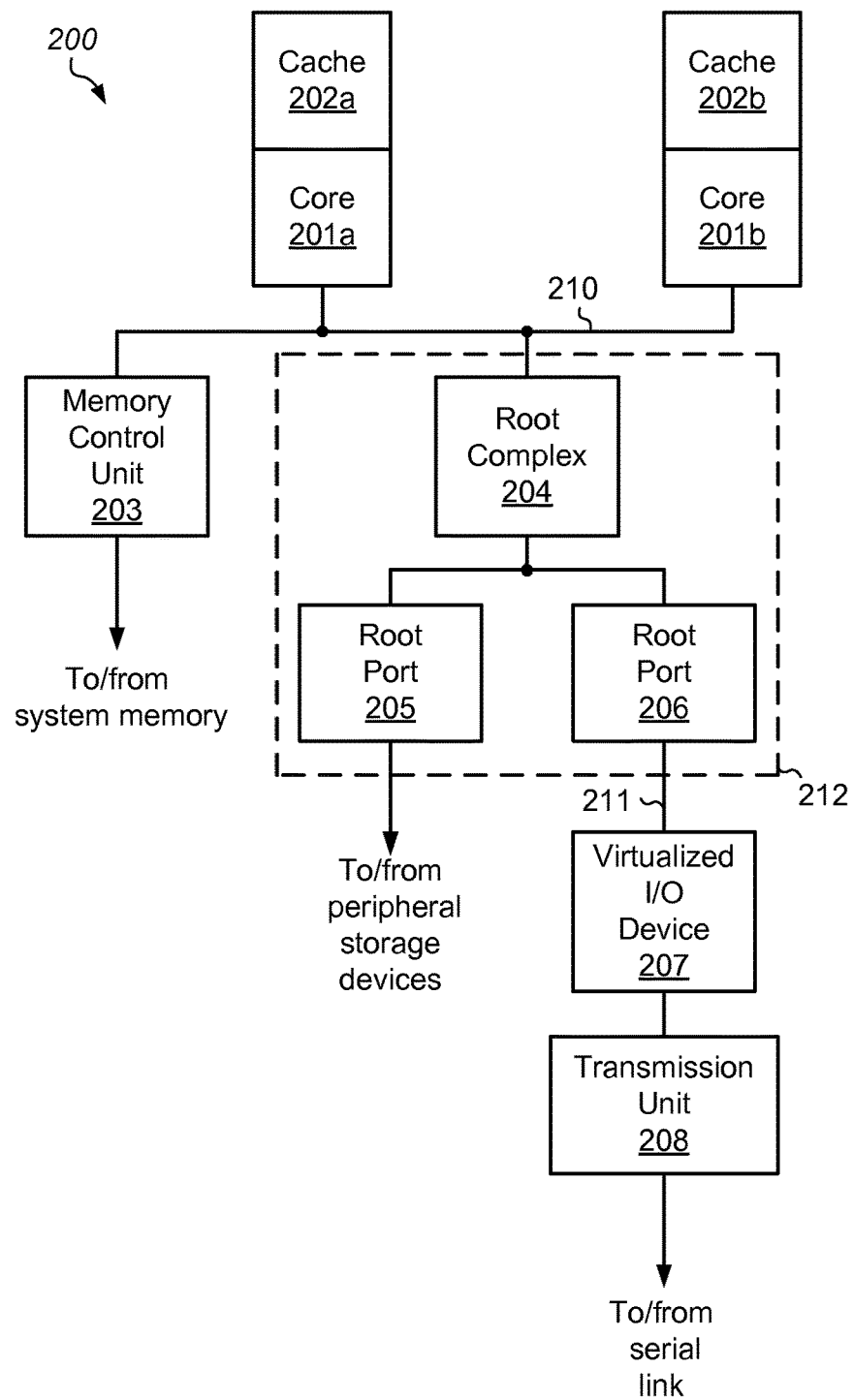
FIG. 2 is a block diagram of an embodiment of a processor.

A block diagram illustrating one embodiment of a SoC processor 200 is shown in FIG. 2. In some embodiments, processor 200 may correspond to processors 120a-c of DCU 100 in FIG. 1. In the illustrated embodiment, processor 200 includes processor cores 201a and 201b. It is noted that although two cores are shown, in various embodiments, any suitable number of processor cores may be employed. Each of cores 201a-b is coupled to a respective one of cache paritions 202a-b. Cores 201a-b are coupled to each other and to memory control unit 203, and communication unit 204 via on-chip network 210. On-chip network 210 may be a point-to-point network, ring-based network, or any other suitable network configuration that allows for communication between processor cores 201a-b, memory interface 203 and communication unit 212. In some embodiments, on-chip network 210 may include a multi-wire parallel bus, and requests and responses between the various devices may be transmitted via the multi-wire parallel bus using an suitable communication protocol.

Cores 201a-b may be configured to execute instructions and to process data according to a particular instruction set architecture (ISA). In one embodiment, cores 201a-b may be configured to implement the SPARC® V9 ISA, although in other embodiments it is contemplated that any desired ISA may be employed, such as x86, PowerPC® or MIPS®, for example. In the illustrated embodiment, each of cores 201a-b may be configured to operate independently of the others, such that all cores 201a-b may execute in parallel. Additionally, in some embodiments each of cores 201a-b may be configured to execute multiple execution threads (or simply "threads") concurrently, where a given thread may include a set of instructions that may execute independently of instructions from another thread. (For example, an individual software process, such as an application, may consist of one or more threads that may be scheduled for execution by an operating system.) A core capable of executing multiple execution threads may be referred to as a multithreaded (MT) core.

Cache memory partitions 202a-b may, in various embodiments, collectively form a level 3 (L3) cache memory for processor 200. The multiple cache memory partitions need to maintain coherency with respect to each other. Cache memory partitions 202a-h may, in various embodiments, implement one of numerous coherency protocols, such as, e.g., MOESI, MESI, or any suitable cache coherency protocol.

Each of cache memory partitions 202a-b may be configured to cache instructions and data for use by cores 201a-b. In the illustrated embodiment, each of cache memory partitions 202a-b may be separately addressable and independently accessed, may concurrently return data to a respective core of cores 201a-b. In some embodiments, each individual cache memory partition may be implemented using set-associative or direct-mapped techniques. For example, in one embodiment, each of cache memory partitions 202a-h may be a 8 megabyte (MB) cache, although other cache sizes and organizations are possible and contemplated Memory interface 203 may be configured to manage the transfer of data between cache partitions 202a-b and system memory in response to fill requests and data evictions. Memory interface 203 may be configured to interface to any suitable type of system memory, such as described above in reference to FIG. 1 In some embodiments, memory interface 203 may be configured to support interfacing to multiple different types of system memory.

Communication unit 212 includes a PCIe Root Complex 204 and Root Ports 205 and 206, and may be configured to transfer data between processor 200 and other devices. It is noted that although a single Root Complex and two Root Ports are shown in the present embodiment, other embodiments may include any quitable number of Root Complexes and Ports. PCIe Root Complex 204 may, in various embodiments, be configured to relay requests and responses (collectively "transactions") between processor 200 and devices couple to Root Ports 205 and 206. Since transactions may be formatted differently on on-chip network 210 than what the aformentioned devices are capable of receiving, PCIe Root Complex 204 may translate the transactions from the communication protocol of on-chip network 210 to a communication protocol compatible with a device coupled to one of Root Ports 205 and 206. The translation of a transaction may include the translation of an addresses from the address space of processor 200 to a device address space, as well as the conversion of multi-bit data words into data packets to be transmitted in a serial fashion. It is noted that in the present embodiment, communication unit 212 includes circuit blocks specific to the PCIe communication protocol as a particular example to aid in explanation. In other embodiments, any suitable communication protocol may be employed, such as, Peripheral Component Interface (PCI) and Accelerated Graphics Port (AGP), for example.

Each of Root Ports 205 and 206 may be configured to relay a translated transaction to a particular device in accordance with a particular communication protocol. In some embodiments, Root Port 205 may be configured to relay a translated transaction to a device. In various embodiments, Root Port 205 may transmit the translated transaction to the device using one of various communication protocols, such as the PCIe communication protocol, for example. Such transactions may be sent outside of integrated circuit chip 213.

Root port 206 is coupled to virtualized device 207 via virtual link 211. As described below in more detail, virtualized device 207 may include circuitry configured to peform multiple functions, each of which may be accessed by separate Guest Operation Systems (GOS) being executed by processor 200, thereby allowing the hardware resources of virtualized device 207 to be shared among multiple software resources. Transactions relayed to virtualized device 207 via virtual link 211 may be encoded in accordance with any suitable protocol. In various embodiments, virtualized device 207, along with cores 201a-b, cache partitions 202a-b, memory control unit 203, root complex 204, root ports 205 and 206, and virtualized device 207 may be fabricated on the same integrated circuit chip 213. In such cases, virtual link 211 may not be limited by pin count, and may employ a multi-bit (parallel) data bus for improved communication speed and reliability.

Virtualized device 207 is further coupled to transmission unit 208. In various embodiments, transmission unit 208 may implement one or more network adaptor functions allowing virtualized device 207 access to external device via a high-speed serial data link. For example, the transmission unit 208 may implement ENet, InfiniBand, or other suitable communication protocol.

It is noted that the embodiment illustrated in FIG. 2 is merely an example. In other embodiments, different devices, different numbers of cores, caches and devices, and different configurations of cores, caches, and devices are possible and contemplated.

As mentioned above, hardware resources of a virtualized device may be shared between different threads or GOSs. Each thread or GOS sharing the hardware resources of the virtualized device may accesses different "virtual" function performed the hardware resources of the virtualized device. To perform the actual transfer of data into and out of the virtualized device on behalf of the virtual function, the hardware resources of the virtualized device may implement multiple physical functions.

To manage the sharing of the hardware resources, additional circuitry may implement additional functions (commonly referred to as "conventional functions") that manage access to the hardware resources by allowing the reading and writing of control registers within the virtualized device. Tasks included in the conventional function may be isolated from the physical and virtual functions so that user code and device drivers that access the physical and virtual function are incapable of accessing or interfering with the control tasks.

Figure 3:
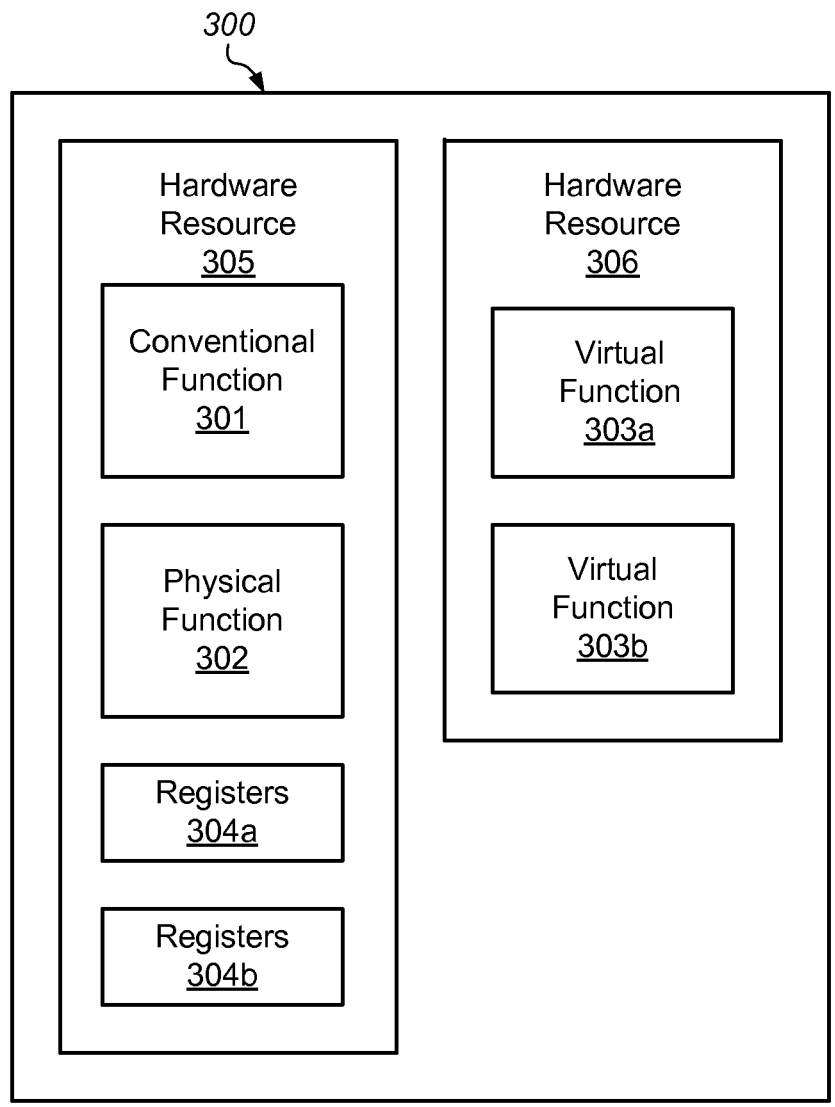
FIG. 3 is a block diagram of an embodiment of a virtualized device.

An embodiment of a virtualized device that is configured to implement multiple virtual functions is illustrated in FIG. 3. In various embodiments, virtualized device 300 may correspond to virtualized device 207 as illustrated in FIG. 2. In the illustrated embodiment, virtualized device 300 includes hardware resources 305 and 306. Hardware resource 305 may be configured to implement conventional function 301, and physical function 302. Additionally, hardware resource 305 includes registers 304a and 304b. Hardware resource 306 may be configured to implement virtual functions 303*a-b*, each of which may be mapped to separate GOSs or threads. In some embodiments, values stored in registers 304*a* and 304*b* may affect the operation of virtual functions 303*a* and 303*b*, respectively.

Hardware resources 305 and 306 may be implemented according to one of various design styles. For example, hardware resources 305 and 306 may be implemented using a dedicated sequential logic circuit or state machine. Alternatively, a general-purpose processor configured to execute software instructions may be used to implement either of hardware resources 305 and 306. Although two hardware resource blocks are depicted in the embodiment illustrated in FIG. 3, it is noted that, in some embodiments, any suitable number of hardware resource blocks, including a single hardware resource block, may be employed in a virtualized device.

In order to implement the tasks included in conventional function 301, hardware resource 305 may include an interface that allows access to control plane management functions within virtualized device 300. Such control plane functions include, without limitation, connections to on-chip networks, communication with a fabric manager, I/O link configuration and training, communication channel establishment, performance monitoring and tuning, and general housekeeping functions. It is noted that, in some embodiments, hardware resource 305 may only include basic circuitry, such as, e.g., control registers and status registers collectively known as control status registers or CSRs (not shown), and that execution of commands associated with the control plane functions may be performed by a particular execution thread running on a processor or processor core, such as core 201*a*, for example.

By handling the control plane tasks of virtualized device 300 using an execution thread running on a processor core, hardware resource 305 may be simplified. Alternatively, or additionally, all communication, i.e., both control and data plane communication, to virtualized device 300 may be performed inband using existing communication capabilities thereby reducing a need for separate communication busses among the circuit blocks within an SoC. With reduced hardware and communication busses, pre-silicon verification and testing of the SoC may, in some embodiments, be simplified.

The execution of physical function 302 and virtual functions 303*a-b*, by hardware resources 305 and 306, collectively manage the transfer of data into and out of virtualized device 300 (commonly referred to as data plane functions). Such data plane functions may, in various embodiments, include management of user payload data stored in user-accessible queues, and encapsulation of such data into packets for transmission via an I/O link.

The data plane functions are accessed via software instructions running as part of an execution thread on a given processor or processor core. In various embodiments, the software instructions may be part of driver software (commonly referred to as a "device driver") for virtualized device 300. Physical function 302 and each of the virtual functions 303*a-b* may be mapped to a particular range of addresses within the address space of a computing system. The address range claimed by a particular virtual function may be set in a corresponding register. For example, the address range claimed by virtual function 303*a* may be programmed into registers 304*a* (also referred to herein as a "Base Address Register" or "BAR") during initialization. The distinction between physical function 302 and virtual functions 303*a-b* is made because certain operations performed in the virtualized device, such as, e.g., reporting I/O link errors or managing transaction-processing resources shared by all virtual functions, are executed by a version of the driver that comprehends all of the virtual functions. This version of the driver may manipulate resources for these tasks through physical function 302.

When software needs access to a particular physical or virtual function, such as, e.g., virtual functions 303*a-b*, Programmed I/O (PIO) reads or write instructions may be issued via the executing thread. As described below in more detail, a software layer existing between the hardware a particular GOS instance may prevent unauthorized access to a particular function. Access to the CSRs may also be limited for security reasons.

It is noted that the embodiment illustrated in FIG. 3 is merely an example. In other embodiments, different numbers of virtual functions, and different control mechanisms may be employed.

Figure 4:
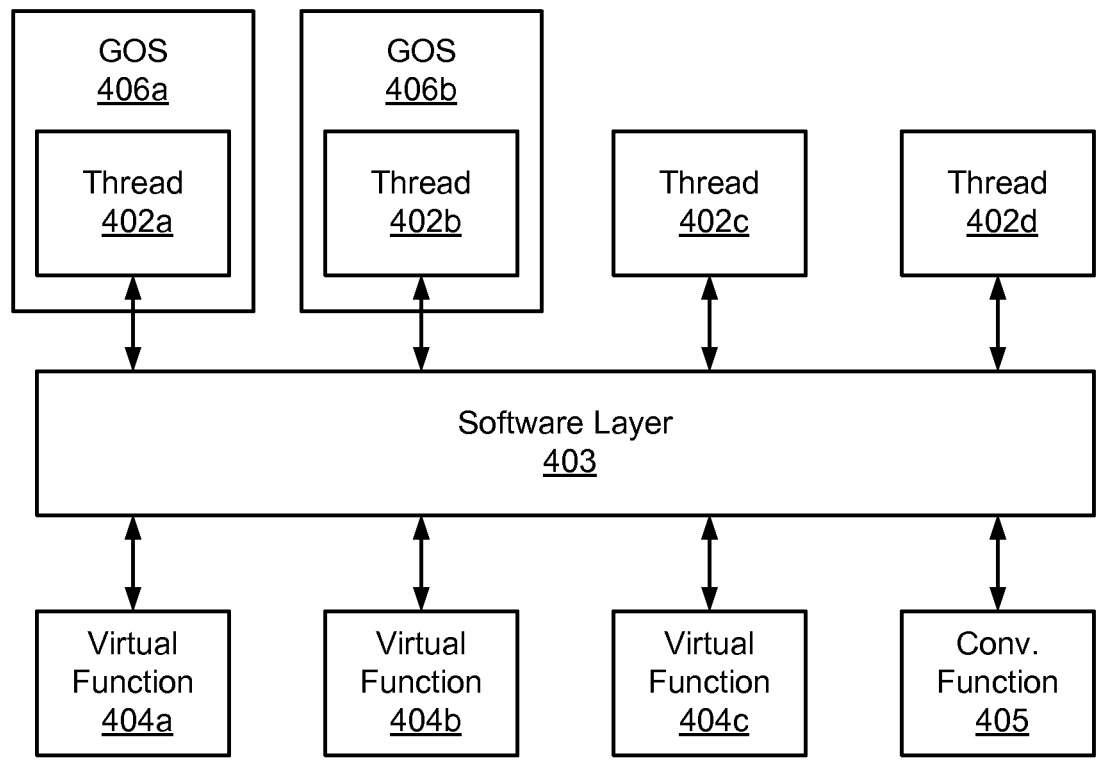
FIG. 4 is a block diagram illustrating control of a virtualized device.

Turning to FIG. 4, a block diagram illustrating control of a virtualized device is depicted. In the illustrated embodiment, execution threads 402*a-d* communication with software layer 403. In turn, software layer 403 communicates with virtual functions 404*a-c* and conventional function 405. In various embodiments, virtual functions 404*a-c* and conventional function 405 may be included in the functionality of a virtualized device, such as virtualized device 300 as illustrated in FIG. 3, for example.

Software layer 403 may, in various embodiments, map access requests from thread 402*a* to virtual function 404*a*. In a similar fashion, access requests associated with thread 402*b* may be mapped to virtual function 404*b*, and thread 402*c* may be mapped to virtual function 404*c*. Additionally, thread 402*d* may be mapped to conventional function 405. During the mapping process, software layer 403 (also referred to herein as a "hypervisor layer") may enforce security protocols. For example, software layer 403 may block access to CSRs included within the virtualized devices.

Each of threads 402*a*, 402*b*, and 402*c*, may access data plane functions included with virtual functions 404*a-c*, respectively. In some embodiments, the data plane functions may include the managements of access to the hardware resources associated with the virtualized device, such as, e.g., hardware resources 305 and 306, in order to send or receive user payload data. For example, the data plane functions may be used to encapsulate user payload data into packets for transmission via an I/O link through a transmission unit, such as transmission unit 208 as depicted in FIG. 2

In some embodiments, thread 402*d* may manage control plane functions included within the virtualized device. Such control plane functions may include managing communication with a fabric manager, I/O link configuration and training, communication channel establishment, performance monitoring and tuning, and general housekeeping functions. By employing an execution thread running on a processor core to handle these general housekeeping tasks, circuitry included in the virtualized device may be simplified, which results in a shorter hardware design and verification cycle, as well as a smaller and less expensive chip.

Thread 402*a* is utilized by GOS 406*a*, and thread 402*b* is utilized GOS 406*b*. Since each of execution threads 402*a* and 402*b* are employed by different GOS instances, the hardware resources associated with the virtualized device are effectively shared between the two GOS instances. It is noted that although only two threads included in two respective GOS are depicted in the embodiment illustrated in FIG.

4, in other embodiments, any suitable number of execution threads and GOS instances may be employed.

Figure 5:
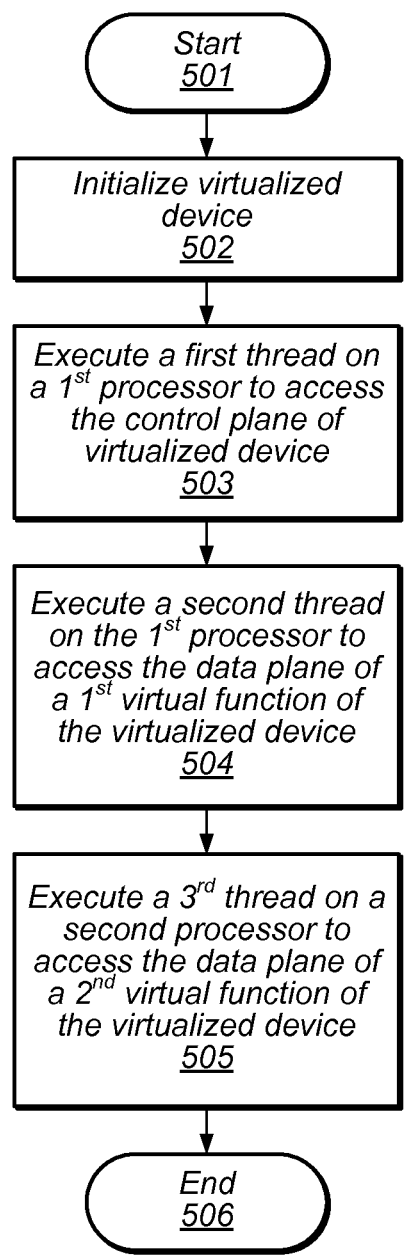
FIG. 5 illustrates a flow diagram depicting the operation of a virtualized device.

Turning to FIG. 5, a flow diagram depicting an embodiment of a method for operating a virtualized device is illustrated. The method begins in block 501. The virtualized device, such as, e.g., virtualized device 207 as illustrated in FIG. 2, may then be initialized (block 502). In some embodiments, during a boot procedure performed by a computing system, CSRs or other registers included in a virtualized device of the computing system may be programmed with predetermined values. The predetermined values may, in some embodiments, correspond to address locations or ranges mapped to an I/O subsystem of the computing system. The virtualized device may be fabricated as part an integrated circuit that includes multiple multi-thread processor cores as well as other circuit blocks, collectively forming an SoC.

A first thread may then be executed on a first processor to access control plane functions of the virtualized device (block 503). In some embodiments, the control plane functions may include managing communication with a fabric manager, I/O link configuration and training, communication channel establishment with a remote computer, performance monitoring and tuning, and general housekeeping functions. CSRs may be written to or read from as part of performing the control plane functions.

A second thread may then be executed on the first processor to access data plane functions associated with a physical function or a first virtual function of the virtualized device (block 504). In various embodiments, the data plane functions may include the management of access to the hardware resources of virtualized device in order to facilitate movement of user payload data. The user payload data may be encapsulated into packets for transmission via an I/O link through a transmission unit, such as transmission unit 208 as illustrated in FIG. 2, for example. It is noted that, in some embodiments, the second thread may include instructions that are included in a device driver for the virtualized device. It is further noted that in some embodiments, the second thread may be executed on a processor or processor core that is different from the processor or processor core executing the first execution thread.

A third thread may be executed on a second processor, different from the first processor, to access the data plane functions associated with a second virtual function (block 505). In some embodiments, the third thread may be executed as part of a GOS or other virtual machine running with the computing system. By allowing access to the virtualized device by an execution thread running as part of a GOS, the hardware resources of the virtualized device may be shared amongst multiple GOSs. The method may conclude in block 506.

Although the operations of the method illustrated in FIG. 5 are depicted as being performed in a sequential fashion, in other embodiments, one or more of the depicted operations may be performed in parallel.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a processor configured to execute instructions included in a plurality of execution threads, wherein a given one of the plurality of execution threads includes instructions that are executable independently of instructions in other ones of the plurality of execution threads;
   a first device configured to perform a first plurality of functions and a second plurality of functions, wherein the first device includes a plurality of registers and at least one hardware resource configured to be shared by the plurality of execution threads, wherein the first plurality of functions includes control functions for a serial data link, and wherein the second plurality of functions includes data functions for transmitting data packets via the serial data link;
   a transmission unit coupled to the first device, wherein the transmission unit is configured to send and receive the data packets via the serial data link; and
   a communication unit coupled to the processor on a common integrated circuit chip, wherein the communication unit includes a first port coupled to the first device via a first link, wherein the first port is configured to:
      receive one or more first instructions from the processor, wherein the one or more instructions are formatted according to an on-chip communications protocol;
      translate the one or more first instructions from the on-chip communication protocol to a first communication protocol compatible with the first device; and
      send translated versions of the one or more first instructions to the first device via the first link using the first communication protocol;
   wherein the processor is further configured to:
      execute a first set of commands included in a first execution thread of the plurality of execution threads, wherein the first set of commands is executable to control the first plurality of functions; and
      execute a second set of commands included in a second execution thread of the plurality of execution threads, wherein the second set of commands is executable to control the second plurality of functions.

2. The apparatus of claim 1, further including a second device, and wherein the communication unit includes a second port coupled to the second device via a second link, wherein the second port is configured to:
   receive one or more second instructions from the processor, wherein the one or more second instructions are formatted according to the on-chip communication protocol;

translate the one or more second instructions from the on-chip communication protocol to a second communication protocol compatible with the second device, wherein the second communication protocol is different than the first communication protocol; and send translated versions of the one or more second instructions to the second device via the second link using the second communication protocol.

3. The apparatus of claim 1, wherein the first device, is also included on the common integrated circuit chip.

4. The apparatus of claim 1, wherein the second set of commands are included in device driver software for the first device.

5. The apparatus of claim 1, wherein the transmission unit is further configured to send and receive the data packets via the serial data link using an InfiniBand communication protocol.

6. The apparatus of claim 1, wherein the processor is further configured to execute a third set of commands included in a software layer, wherein at least one command of the third set of commands is associated with writing a value into at least one configuration register of the first device, wherein the software layer includes at least one command to restrict access to the at least one configuration register.

7. A method, comprising:
executing, by a first processor, a first set of commands included in a first execution thread of a plurality of execution threads to generate a first request formatted according to an on-chip communication protocol, wherein the first request is associated with a first plurality of functions performed by a first device, wherein the first plurality of functions includes at least a first function to train a serial data link, and wherein a given one of execution threads includes instructions that are executable independently of instructions included in other ones of the plurality of execution threads;

executing, by the first processor, a second set of commands included in a second execution thread of the plurality of execution threads to generate a second request formatted according to the on-chip communication protocol, wherein the second request is associated with a second plurality of functions performed by the first device, wherein the second plurality of functions includes a particular function to encapsulate data into packets for transmission via the serial data link, and wherein the second plurality of functions includes at least a second function to modify data received by the first device;

translating, by a communication circuit, the first and second request from the on-chip communication protocol to a first communication protocol compatible with the first device, wherein the communication circuit is coupled to the first processor on a common integrated circuit chip, and wherein the communication circuit is coupled to the first device via a first link;

transmitting, by the communication circuit, the first request to the first device via the first link using the first communication protocol; and transmitting, by the communication circuit, the second request to the first device via the first link using the first communication protocol.

8. The method of claim 7, further comprising:
executing, by a second processor, a third set of commands included in a third execution thread to generate a third request formatted according to the on-chip communication protocol, wherein the third request is associated with the second plurality of functions;

translating, by the communication circuit, the third request from the on-chip communication protocol to the first communication protocol; and transmitting, by the communication circuit, the third request to the first device via the first link using the first communication protocol.

9. The method of claim 8, wherein the second processor, and the first device are also included on the common integrated circuit chip.

10. The method of claim 7, further comprising, in response to the first device receiving the second request, transmitting, by a transmission unit coupled to the first device, one or more data packets via the serial data link using an InfiniBand communication protocol.

11. The method of claim 7, further comprising storing, by the first processor, at least one value in a register included in the first device during an initialization operation.

12. The method of claim 7, further comprising, executing by a third processor a fourth set of commands included in a fourth execution thread to generate a fourth request formatted according to the on-chip communication protocol, wherein the fourth request is associated with a third plurality of functions performed by a second device, wherein the third plurality of functions includes at least a third function to modify data received by the second device.

13. The method of claim 12, further comprising:
translating, by the communication circuit, the fourth request from the on-chip communication protocol to a second communication protocol compatible with the second device; and transmitting, by the communication circuit, the fourth request to the second device via a second link using the second communication protocol.

14. A system, comprising:
a plurality of processors, wherein a first processor of the plurality of processors is configured to:
execute, in a first execution thread of a plurality of execution threads, a first instruction included in a first subset of a first plurality of software instructions to generate a first request, wherein the first plurality of software instructions is included in a first guest operating system; and execute, in a second execution thread of the plurality of execution threads, a second instruction included in a second subset of the first plurality of software instructions to generate a second request;

wherein a second processor of the plurality of processors is configured to execute a second plurality of software instructions included in a second guest operating system to generate a third request;

a first device including a plurality of registers, wherein the first device is configured to perform a plurality of command functions and a plurality of virtual functions, wherein the plurality of command functions includes a command to train a serial data link, and wherein the first device includes at least one hardware resource configured to be shared by two or more virtual functions of the plurality of virtual functions, and wherein the plurality of virtual functions include a particular function to encapsulate data into packets for transmission via the serial data link;

a transmission unit coupled to the first device, wherein the transmission unit is configured to send and receive data packets via the serial data link;

a second device; and a communication unit coupled to the plurality of processor on a common integrated circuit chip, wherein the communication unit includes a first port and a second port, wherein the first port is coupled to the first device via a first link and the second port is coupled to the second device via a second link;

wherein the first port is configured to:
   receive the first request from the first processor, wherein the first request is formatted according to an on-chip communication protocol, and wherein the first request is associated with at least one command function of the plurality of command functions;
   translate the first request from the on-chip communication protocol to a first communication protocol compatible with the first device;
   relay the first request to the first device via the first link using the first communication protocol;
   receive the second request from the first processor, wherein the second request is formatted according to the on-chip communication protocol, and wherein the second request is associated with at least on virtual functions of the plurality of virtual functions; and
   translate the second request from the on-chip communication protocol to the first communication protocol.

15. The system of claim 14, wherein the first port is further configured to:

receive a third request from the second processor, wherein the third request is formatted with the on-chip communication protocol;
   translate the third request from the on-chip communication protocol to the first communication protocol; and
   relay the third request to the first device via the first link using the first communication protocol.

16. The system of claim 14, wherein the second processor is further configured to execute, the at least a third instruction of the second plurality of software instructions to generate a fourth request, and wherein the second port is configured to:
   receive the fourth request from the second processor, wherein the fourth request is formatted with the on-chip communication protocol;
   translate the fourth request from the on-chip communication protocol to a second communication protocol compatible with the second device; and
   relay the fourth request to the second device via the second link using the second communication protocol.

17. The system of claim 16, wherein the second communication protocol includes a Peripheral Component Interface Express (PCIe).

18. The system of claim 14, wherein the transmission unit is configured to send and receive the data packets via the serial data link using an InfiniBand communication protocol.

19. The system of claim 14, wherein the first device is further included on the common integrated circuit chip.

* * * * *

UNITED STATES PATENT AND TRADEMARK OFFICE
CERTIFICATE OF CORRECTION

PATENT NO. : 10,853,303 B2
APPLICATION NO. : 14/944835
DATED : December 1, 2020
INVENTOR(S) : Feehrer et al.

It is certified that error appears in the above-identified patent and that said Letters Patent is hereby corrected as shown below:

In the Specification

In Column 1, Line 6, delete "each each" and insert -- each --, therefor.

In Column 4, Line 51, delete "paritions" and insert -- partitions --, therefor.

In Column 5, Line 53, delete "aformentioned" and insert -- aforementioned --, therefor.

In Column 6, Line 14, delete "peform" and insert -- perform --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*